Patented July 4, 1944

2,353,023

UNITED STATES PATENT OFFICE 2,353,023

PROCESS FOR THE TREATMENT OF CELLULOSE ACETATE FILMS

Ernest Freund, New York, N. Y., and Friedrich Deutsch, Rechoboth, Palestine

No Drawing. Application August 6, 1940, Serial No. 351,620

4 Claims. (Cl. 18—48)

The present invention relates to the treatment of plastic, organic colloids, and has particular relation to the treatment of cellulose acetate films.

It has been found that the dimension, in the direction of orientation, of cellulose acetate films can be increased without any stretching treatment, by subjecting said films to the action of certain liquids under conditions described hereinafter. Orientation of the films may take place prior to or during said treatment with a liquid. In the present specification and claims, we denote such increase of a dimension without stretching as "spontaneous expansion" or "spontaneous extension." Such spontaneous extension is distinctly distinguished from a swelling process in that spontaneous extension is substantially retained by the colloid treated after drying the same, as will be further explained below.

In carrying out this invention a film which consists substantially of or comprises as an essential ingredient cellulose acetate and which contains a residual amount of a genuine solvent for the cellulose acetate, is used as starting material. According to this invention an anisotropic artificial structure is used, i. e., a cellulose acetate film, the micelles of which are orientated in the longitudinal direction. Such film is subjected within certain temperature limits to the action of a liquid having a limited swelling action on said film. The temperature range in which such treatment should be carried out, depends on the characteristics of the starting material, and on the characteristics of the liquid or the vapor used.

In carrying out the present invention, for example, cellulose acetate strips of 10 cm. length, 1 cm. width and 0.4 mm. thickness may be prepared by casting an acetone solution of acetylcellulose having an acetic acid content of 52% on a suitable support, evaporating the solvent preferably at a low temperature of about 30° C., and, if desired, subjecting the film thus obtained to further drying at 80° C., for example. The strips thus obtained, which still contain some residual solvent, for instance 2–3% acetone, are then subjected to swelling at about 15° C. in a mixture of 70% ethyl alcohol and 30% water for about 3 minutes. The swollen strips are then orientated in their longitudinal direction, by stretching the strips in said direction, the degree of stretching amounting for example to 30%. The orientated strips may be washed with water and dried at a low temperature and may then be treated according to the present invention. This may be effected, for example, by subjecting said strips to the action of a boiling mixture of 10% ethyl alcohol and 90% water for some minutes. During such treatment, the strips show an expansion in the longitudinal direction while the other dimensions of the strips diminish. The degree of said expansion amounts to about 100%. It has been found that the degree of such expansion is dependent upon the characteristics of the cellulose derivative treated, the liquid used for such treatment, and upon the conditions under which said treatment is performed.

For obtaining the above described phenomenon of expansion without stretching, any cellulose acetate film may be used, provided said structure contains residual amounts of a genuine solvent for said cellulose derivative. It has been found, however, that the presence of a considerable amount of certain non-solvents, for example water, ethyleneglycol, glycerine, in the solution from which the cellulose derivative structure is prepared, has an unfavorable effect on the spontaneous extension according to this invention. If, for example, a cellulose acetate film is prepared by evaporation from an acetone solution which contains 7% of water, the film does not show spontaneous extension under the above described conditions. The presence of certain plasticizers or certain other admixtures, such as synthetic resins however, the presence of tricresyl phosphate, for example, is not injurious to the spontaneous extension according to this invention. In order to avoid the unfavorable influence of certain nonsolvents, it is preferable to use for the preparation of the artificial cellulose derivative structures, solutions which contain only genuine solvents, and, if desired, certain plasticizers and/or other of the above mentioned admixtures.

It has been found, however, that films of cellulose acetate, which contain water or other nonsolvents, are also capable of spontaneous extension according to this invention. Such shaped articles may, for instance, be prepared by casting a cellulose derivative solution which contains a certain amount of a high-boiling water-soluble solvent, substantially evaporating said lower boiling solvent, and at least partly removing the higher boiling solvent by treating the coagulated article with water.

The orientation of the artificial structures to be subjected to the process of this invention, may be effected in any suitable manner. Such orientation may for instance, be performed by subjecting said artificial structures to swelling and subsequent stretching. Swelling may be omitted and orientation may be effected by stretching only, i. e., without previous swelling. The latter however, in many cases facilitates stretching.

The orientation may also be effected during the forming process if the solvents are not quite evaporated. Addition of higher boiling solvents in this case is favorable. Instead of using anisotropic, i. e., orientated films for obtaining spontaneous extension, isotropic artificial structures may also be used for carrying out this invention, as will be explained in more detail further below.

In order to obtain spontaneous extension, the orientated artificial structure is exposed to the action of certain liquids at proper temperatures. It has been found that the use of a liquid which has a limited swelling effect on the cellulose derivative treated, is necessary for obtaining spontaneous expansion of the cellulose derivative. Such substances are water or aqueous liquids, i. e., liquids comprising mixtures of water and other liquids. The medium to be used may consist of one compound, for example water, or of a mixture, for example a homogenous mixture of water and alcohol or a dispersion or emulsion of water and butyl phthalate, for example. In certain cases the simultaneous use of solid substances, particularly salts, which are dissolved in the above mentioned liquids, has proved to be of advantage.

Mixtures of ethyl alcohol and water, mixtures of diacetone alcohol and water, an aqueous solution of pyridine containing for example 3% pyridine; a 5% aqueous solution of ethyl lactate; an 8% aqueous solution of butyl alcohol; a solution of 4% crotonic aldehyde in water; a 7% aqueous solution of triethanolamine; a 5% aqueous solution of dioxane; a 6% aqueous solution of acetic acid, may be mentioned as examples of the medium in which the cellulose derivative structure is treated according to this invention. The above concentrations of the liquids may be used for the treatment of cellulose derivatives at boiling temperature (at atmospheric pressure) or at a lower temperature or higher temperature in a certain range, which range will be explained in more detail further below. The above concentrations of the liquids may also be varied, furthermore aqueous liquids containing formaldehyde, paraldehyde, butyric or propionic acid, may also be used.

It has been further found that the treatment of cellulose-derivative structures with the above mentioned liquids must be carried out between certain temperature limits in order to obtain spontaneous expansion of said structures. There is a lower temperature limit at which spontaneous expansion occurs. By increasing the temperature above such limit spontaneous expansion is also increased to an optimum value, while further increase of temperature after reaching said optimum value, causes decrease of spontaneous extension. Thus, in the treatment of cellulose derivatives structures with the above mentioned liquids at increasing temperatures, spontaneous extension occurs at a certain lowest limit. The spontaneous extension may be increased to reach an optimum value, by further increasing the temperature of treatment and it declines to fall to zero if the temperature is sufficiently increased above that of the optimum value. Said lower and upper limits, as well as the optimum temperature are dependent on the characteristics of the cellulose derivative structure treated, and on the characteristics of the liquid or vapor used.

It has been found that anisotropy is necessary for obtaining spontaneous expansion according to this invention. Such anisotropy of the artificial cellulose derivative structures, can be produced, however, also during spontaneous expansion. This can be effected, for example, by means of a certain tension to which the artificial structure is subjected during the spontaneous expansion, i. e., while treated in a bath of liquids, in which such expansion takes place. This tension may be so small that it causes orientation of the artificial cellulose structure only at the elevated temperature at which the spontaneous expansion takes place.

*Example 1.*—Films of about 0.04 mm. thickness are prepared by casting a 17% acetone solution of a cellulose acetate having 52% acetic acid content. The acetone is evaporated at ordinary room temperature. The films are stretched in a known manner by about 20%, and they are then cut in the direction of stretching to strips of 0.3–1 mm. width and 10 cm. length. The strips thus obtained, then treated by immersion in a boiling bath consisting of water or of a mixture of water and diacetone alcohol show the following spontaneous expansion after a treatment of 4 minutes:

| Bath containing— | | Spontaneous longitudinal extension |
|---|---|---|
| Water | Diacetone alcohol | |
| *Percent* | *Percent* | *Percent* |
| 100 | ------------ | 30 |
| 95 | 5 | 90 |
| 90 | 10 | 97 |
| 80 | 20 | 46 |
| 70 | 30 | 38 |

Essentially the same results may be obtained by the treatment under similar conditions of a cellulose acetate which has an acetic acid content of 52% and the films of which were prepared in the above described manner from an acetone solution containing 2% of diethyl phthalate.

*Example 2.*—Strips of 83 mm. length, 10 mm. width, and 0.04 mm. thickness are prepared by casting a solution in acetone of a cellulose acetate having an acetic acid content of 53%. After drying the residual acetone content is about 3% by weight. A weight of about 0.6 gram is now attached to one longitudinal end of each of these strips and the strips are then immersed freehanging, with said weight on their lower end, in the bath in which the spontaneous extension takes place. Thus, to each of the strips a weight of 0.6 gram being attached, the strips are put under a slight tension. The bath consists of 20 parts by weight of ethyl alcohol and 80 parts of water. By treating the strips in such bath the following results are obtained:

| Temperature, °C. | Spontaneous extension in mm. | Tensile strength after treatment per mm.² in kg. | Elongation after treatment |
|---|---|---|---|
| | | | *Percent* |
| 52 | 3 | 8.1 | 46 |
| 59 | 54 | 10.75 | 25 |
| 67 | 61 | 12.15 | 17 |
| 72 | 37 | 10.50 | 18 |
| 78 | 1 | 6.75 | 46 |

Throughout the present specification and claims, we denote as "temperature range of spontaneous extension" (or expansion) a temperature range within which in the treatment of a cellulose acetate film with a given liquid, spontaneous extension of said cellulose acetate film takes place. Said temperature range may be easily determined by simple experimentation while observing the above disclosed conditions of spontaneous extension.

It has been found that cellulose acetate film lose their capability of spontaneous extension if they are subjected to the action of a liquid at temperatures which are higher than the above mentioned upper limit of spontaneous extension in said liquids or vapors.

Spontaneous extension of anisotropic cellulose derivatives structures is probably caused by a certain intramicellar swelling in which the residual solvents are at least partly removed. This explains that isotropic cellulose derivative structures, containing residual solvents, which were too subjected to intramicellar swelling, have lost their capability of spontaneous extension. A pretreatment by which the genuine residual solvents are removed from the cellulose derivatives has the same effect. It has been further found that a small swelling effect of the liquids or vapors on the cellulose derivatives treated, in most cases corresponds to a high optimum temperature of spontaneous extension. The relatively highest values of spontaneous extension may be obtained with such liquids having a small swelling effect on cellulose derivatives.

The cellulose acetate films obtained according to this invention have been found to be of crystalline structure.

It is to be understood that in the appended claims, the term "temperature range of spontaneous extension" designates the specific temperature range which is characteristic to a certain medium and dependent on the composition of the individual aqueous mediums used, the lower limit of these individual ranges lying above 50° C. and the upper limit being not higher than the boiling temperature of the respective medium, as shown by the examples.

We claim:

1. A process for treating a cellulose acetate film containing a residual solvent, said process comprising the step of subjecting said cellulose acetate film to longitudinal orientation by mechanical action, and immersing in an aqueous medium within the temperature range of spontaneous extension, said range depending on the composition of the aqueous medium, the lower limit of the range lying above 50° C. and the upper limit being not higher than the boiling temperature of the aqueous medium, said medium containing an organic component, and said medium having a limited swelling effect on said cellulose acetate film.

2. A process as claimed in claim 1, in which a mixture consisting of water and up to 30% of ethylalcohol is used as an aqueous medium.

3. A process as claimed in claim 1, in which a mixture consisting of water and up to 30% of diacetone alcohol, is used as an aqueous medium.

4. A process as claimed in claim 1, in which a mixture consisting of water and up to 30% of ethyl lactate is used as an aqueous medium.

ERNEST FREUND.
FRIEDRICH DEUTSCH.